(12) United States Patent
Koch et al.

(10) Patent No.: US 10,976,408 B2
(45) Date of Patent: Apr. 13, 2021

(54) METHODS AND SYSTEM FOR ENHANCED RFID DIRECTION FINDING

(71) Applicant: ZEBRA TECHNOLOGIES CORPORATION, Lincolnshire, IL (US)

(72) Inventors: Michael J. Koch, Fort Salonga, NY (US); Benjamin J. Bekritsky, Modiin (IL); Charles Burton Swope, Coral Springs, FL (US)

(73) Assignee: Zebra Technologies Corporation, Lincolnshire, IL (US)

( * ) Notice: Subject to any disclaimer, the term of this patent is extended or adjusted under 35 U.S.C. 154(b) by 306 days.

(21) Appl. No.: 16/235,835

(22) Filed: Dec. 28, 2018

(65) Prior Publication Data

US 2020/0209348 A1    Jul. 2, 2020

(51) Int. Cl.
*G01S 7/02*   (2006.01)
*G01S 13/75*   (2006.01)
*G01S 13/76*   (2006.01)
*G01S 13/87*   (2006.01)

(52) U.S. Cl.
CPC .............. *G01S 7/021* (2013.01); *G01S 13/75* (2013.01); *G01S 13/767* (2013.01); *G01S 13/876* (2013.01); *G01S 13/878* (2013.01)

(58) Field of Classification Search
CPC ...... G01S 13/75; G01S 13/751; G01S 13/767; G01S 13/876; G01S 13/878; G01S 7/021
See application file for complete search history.

(56) References Cited

U.S. PATENT DOCUMENTS

| | | | |
|---|---|---|---|
| 9,195,866 B1 * | 11/2015 | Mehranfar | H04W 4/02 |
| 9,773,136 B2 * | 9/2017 | Koch | G06K 7/10356 |
| 2006/0170565 A1 * | 8/2006 | Husak | G06K 7/10356 340/8.1 |
| 2009/0303005 A1 * | 12/2009 | Tuttle | H04Q 9/00 340/10.1 |
| 2010/0039228 A1 * | 2/2010 | Sadr | G06K 7/10366 340/10.1 |
| 2010/0328073 A1 * | 12/2010 | Nikitin | G01S 5/12 340/572.1 |
| 2013/0201003 A1 * | 8/2013 | Sabesan | G06K 19/0723 340/10.1 |
| 2014/0022059 A1 * | 1/2014 | Horst | G06K 7/10009 340/10.3 |
| 2015/0169910 A1 * | 6/2015 | Koch | G01S 13/825 340/10.1 |

(Continued)

*Primary Examiner* — Peter M Bythrow
(74) *Attorney, Agent, or Firm* — Yuri Astvatsaturov

(57) ABSTRACT

At least some embodiments of the present invention are directed to RFID reader systems configured to estimate a directional bearing of an RFID tag. In an embodiment, the present invention is an RFID system configured in a way that upon a detection of a variance in the direction of a maximum RSSI value for a given RFID tag in response to a plurality of interrogation signals transmitted by an RFID reader over a respective plurality of different directions, the RFID reader retransmits the plurality of interrogation signals over the respective plurality of different directions with successively lower power levels until the only response(s) being received no longer exhibit the previously detected variance.

21 Claims, 9 Drawing Sheets
(1 of 9 Drawing Sheet(s) Filed in Color)

(56) References Cited

U.S. PATENT DOCUMENTS

| | | | |
|---|---|---|---|
| 2015/0363616 A1* | 12/2015 | Kumar | G01S 13/75 340/8.1 |
| 2016/0103198 A1* | 4/2016 | Swope | G01S 3/28 342/372 |
| 2016/0104013 A1* | 4/2016 | Fessler | G01S 13/84 340/10.1 |
| 2017/0109555 A1* | 4/2017 | Koch | G06K 7/10099 |
| 2019/0079176 A1* | 3/2019 | Weissman | G01S 3/18 |
| 2020/0034583 A1* | 1/2020 | Nikitin | G06K 7/10475 |
| 2020/0042754 A1* | 2/2020 | Trivelpiece | G01S 5/021 |

* cited by examiner

METHODS AND SYSTEM FOR ENHANCED RFID DIRECTION FINDING

FIELD OF INVENTION

At least some embodiments of the present invention generally relate to RFID-based locationing, and more specifically, to techniques used to more accurately locate RFID tags in environments where multipath may exist.

BACKGROUND

A general approach to locationing radio frequency (RF) identification (RFID) tags involves transmitting an RF beam along a certain direction and thereafter 'listening' for a response from an RFID tag from a variety of directions. In an environment where a direct line of sight to a tag is guaranteed, it is highly likely that a direction associated with the strongest RFID tag response is the direction of the tag. However, in environments where multipath may exist, the strongest signal received at an RFID reader may be a reflection that originated from an obstructed RFID tag. In this case, associating the direction of the strongest response signal with a direction of the location of the activated RFID tag will lead to an incorrect result.

Accordingly, there exists a need for improved methods, devices, and systems that improved RFID tag direction finding, particularly, in environments where multipath may exist.

SUMMARY

In an embodiment, the present invention is a method of estimating a direction of an RFID tag. The method includes: transmitting, by an RFID reader, a first transmit signal in a first transmit direction; receiving, at the RFID reader, a first plurality of receive signals generated in response to the first transmit signal, each of the first plurality of receive signals having a respective first-receive-signal strength and being received from one of a plurality of receive directions; transmitting, by the RFID reader, a second transmit signal in a second transmit direction that is different from the first transmit direction; receiving, at the RFID reader, a second plurality of receive signals generated in response to the second transmit signal, each of the second plurality of receive signals having a respective second-receive-signal strength and being received from one of the plurality of receive directions; determining a first receive direction, the first receive direction being associated with one of the first plurality of receive signals having a maximum first-receive-signal strength; determining a second receive direction, the second receive direction being associated with one of the second plurality of receive signals having a maximum second-receive-signal strength; comparing the first receive direction and the second receive direction; responsive to a difference between the first receive direction and the second receive direction being within a predetermined threshold, determining an estimated direction of the RFID tag based on at least one of the first receive direction and the second receive direction; and responsive to the difference between the first receive direction and the second receive direction exceeding the predetermined threshold: (a) transmitting, by the RFID reader, another first transmit signal in the first transmit direction, the another first transmit signal being transmitted at a lower power level than an immediately precedingly transmitted first transmit signal; (b) transmitting, by the RFID reader, another second transmit signal in the second transmit direction, the another second transmit signal being transmitted at a lower power level than an immediately precedingly transmitted second transmit signal; (c) determining one of a presence and a lack of another first plurality of receive signals received at the RFID reader in response to the another first transmit signal; (d) determining one of a presence and a lack of another second plurality of receive signals received at the RFID reader in response to the another second transmit signal; (e) responsive to the presence of the another first plurality of receive signals and the lack of the another second plurality of receive signals, determining the estimated direction of the RFID tag based on the first receive direction; (f) responsive to the lack of the another first plurality of receive signals and the presence of the another second plurality of receive signals, determining the estimated direction of the RFID tag based on the second receive direction; and (g) responsive to the presence of the another first plurality of receive signals and the presence of the another second plurality of receive signals, repeating (a)-(g).

In a variation of this embodiment, responsive to the difference between the first receive direction and the second receive direction exceeding the predetermined threshold, the method further includes: (f.1) responsive to the lack of the another first plurality of receive signals and the lack of the another second plurality of receive signals: transmitting, by the RFID reader, still another first transmit signal in the first transmit direction, the still another first transmit signal being transmitted at a power level that is higher than a power level of the immediately precedingly transmitted first transmit signal and lower than a power level of a most-recent first transmit signal that cause a receipt of a first RFID tag response by the RFID reader; transmitting, by the RFID reader, still another second transmit signal in the second transmit direction, the still another second transmit signal being transmitted at a power level that is higher than a power level of the immediately precedingly transmitted second transmit signal and lower than a power level of a most-recent second transmit signal that cause a receipt of a second RFID tag response by the RFID reader; and repeating (c)-(g).

In another embodiment, the present invention is a method of estimating a direction of an RFID tag. The method includes: transmitting, by an RFID reader, a first transmit signal in a first transmit direction; receiving, by the RFID reader, a first RFID tag response constituting a plurality of first response signals being received from a plurality of receive directions, wherein one of the plurality of first response signals that has a highest signal strength constitutes a maximum first response signal; transmitting, by an RFID reader, a second transmit signal in a second transmit direction different from the first transmit direction; receiving, by the RFID reader, a second RFID tag response constituting a plurality of second response signals being received from the plurality of receive directions, wherein one of the plurality of second response signals that has a highest signal strength constitutes a maximum second response signal; responsive to a difference between a respective direction of the maximum first response signal and a respective direction of the maximum second response signal being within a predetermined threshold, determining an estimated direction of the RFID tag based on at least one of the respective direction of the maximum first response signal and the respective direction of the maximum second response signal; and responsive to the difference between the respective direction of the maximum first response signal and the respective direction of the maximum second response signal exceeding the predetermined threshold: continuing to transmit, by the RFID reader, at successively lower power levels, another first transmit signal in the first transmit direction and another second transmit signal in the second transmit direction until, responsive to the first transmit signal and the second transmit signal being transmitted at some equal power level, the RFID reader receives only one of the first RFID tag response and the second RFID tag response; and determining the estimated direction of the RFID tag based a respective direction of the only one of the first RFID tag response received by the RFID reader.

In still another embodiment, the present invention is an RFID reader system, including: a housing; an antenna assembly positioned at least partially within the housing and configured to transmit RF signals in at least two directions and to receive RF signals from a plurality of directions; and a controller operatively connected to the antenna assembly, the controller configured to: cause the antenna assembly to transmit a first transmit signal in a first transmit direction; cause the antenna assembly to receive a first plurality of receive signals generated in response to the first transmit signal, each of the first plurality of receive signals having a respective first-receive-signal strength and being received from one of a plurality of receive directions; cause the antenna assembly to transmit a second transmit signal in a second transmit direction that is different from the first transmit direction; cause the antenna assembly to receive a second plurality of receive signals generated in response to the second transmit signal, each of the second plurality of receive signals having a respective second-receive-signal strength and being received from one of the plurality of receive directions; determine a first receive direction, the first receive direction being associated with one of the first plurality of receive signals having a maximum first-receive-signal strength; determine a second receive direction, the second receive direction being associated with one of the second plurality of receive signals having a maximum second-receive-signal strength; compare the first receive direction and the second receive direction; responsive to a difference between the first receive direction and the second receive direction being within a predetermined threshold, determine an estimated direction of the RFID tag based on at least one of the first receive direction and the second receive direction; and responsive to the difference between the first receive direction and the second receive direction exceeding the predetermined threshold: (a) cause the antenna assembly to transmit another first transmit signal in the first transmit direction, the another first transmit signal being transmitted at a lower power level than an immediately precedingly transmitted first transmit signal; (b) cause the antenna assembly to transmit another second transmit signal in the second transmit direction, the another second transmit signal being transmitted at a lower power level than an immediately precedingly transmitted second transmit signal; (c) determine one of a presence and a lack of another first plurality of receive signals received at the antenna assembly in response to the another first transmit signal; (d) determine one of a presence and a lack of another second plurality of receive signals received at the antenna assembly in response to the another second transmit signal; (e) responsive to the presence of the another first plurality of receive signals and the lack of the another second plurality of receive signals, determine the estimated direction of the RFID tag based on the first receive direction; (f) responsive to the lack of the another first plurality of receive signals and the presence of the another second plurality of receive signals, determine the estimated direction of the RFID tag based on the second receive direction; and (g) responsive to the presence of the another first plurality of receive signals and the presence of the another second plurality of receive signals, repeat (a)-(g).

In a variation of this embodiment, responsive to the difference between the first receive direction and the second receive direction exceeding the predetermined threshold, the controller is further configured to: (f.1) responsive to the lack of the another first plurality of receive signals and the lack of the another second plurality of receive signals: cause the antenna assembly to transmit still another first transmit signal in the first transmit direction, the still another first transmit signal being transmitted at a power level that is higher than a power level of the immediately precedingly transmitted first transmit signal and lower than a power level of a most-recent first transmit signal that cause a receipt of a first RFID tag response by the antenna assembly; cause the antenna assembly to transmit still another second transmit signal in the second transmit direction, the still another second transmit signal being transmitted at a power level that is higher than a power level of the immediately precedingly transmitted second transmit signal and lower than a power level of a most-recent second transmit signal that cause a receipt of a second RFID tag response by the antenna assembly; and repeat (c)-(g).

In still yet another embodiment, the present invention is an RFID reader system, including: a housing; an antenna assembly positioned at least partially within the housing and configured to transmit RF signals in at least two directions and to receive RF signals from a plurality of directions; and a controller operatively connected to the antenna assembly, the controller configured to: cause the antenna assembly to transmit a first transmit signal in a first transmit direction; cause the antenna assembly to receive a first RFID tag response constituting a plurality of first response signals being received from a plurality of receive directions, wherein one of the plurality of first response signals that has a highest signal strength constitutes a maximum first response signal; cause the antenna assembly to transmit a second transmit signal in a second transmit direction different from the first transmit direction; cause the antenna assembly to receive a second RFID tag response constituting a plurality of second response signals being received from the plurality of receive directions, wherein one of the plurality of second response signals that has a highest signal strength constitutes a maximum second response signal; responsive to a difference between a respective direction of the maximum first response signal and a respective direction of the maximum second response signal being within a predetermined threshold, determine an estimated direction of the RFID tag based on at least one of the respective direction of the maximum first response signal and the respective direction of the maximum second response signal; and responsive to the difference between the respective direction of the maximum first response signal and the respective direction of the maximum second response signal exceeding the predetermined threshold: cause the antenna assembly to continue to transmit, at successively lower power levels, another first transmit signal in the first transmit direction and another second transmit signal in the second transmit direction until, responsive to the first transmit signal and the second transmit signal being transmitted at some equal power level, the antenna assembly receives only one of the first RFID tag response and the second RFID tag response; and determine the estimated direction of the RFID tag based a respective direction of the only one of the first RFID tag response received by the RFID reader.

In still yet another embodiment, the present invention is a method of estimating a direction of an RFID tag. The method includes: transmitting, by an RFID reader, a plurality of transmit signals, each of the plurality of transmit signals being transmitted in a respective direction; for each of the plurality of transmit signals, receiving, at the RFID reader, an RFID tag response including a respective tag response direction associated with a strongest received signal strength indicator; determining one of a presence and a lack of a variance between at least one of the respective tag response direction and at least one other of the respective tag response direction, the variance being present when the at least one of the respective tag response direction differs from the at least one other of the respective tag response direction by at least a predetermined threshold, the variance being lacking when each of the respective tag response direction does not differ from each other of the respective tag response direction by at least the predefined threshold; responsive to the lack of the variance, estimating the direction of the RFID tag based on at least one of the respective tag response direction; and responsive to the presence of the variance, retransmitting the transmit signals that, upon a previous transmission, generated the respective RFID tag response, at a successively lower power level until there is the lack of the variance between the at least one of the respective tag response direction and the at least one other of the respective tag response direction from among a remaining subset of RFID tag responses, and estimating the direction of the RFID tag based on at least one of the respective tag response direction from among the remaining subset of RFID tag responses.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
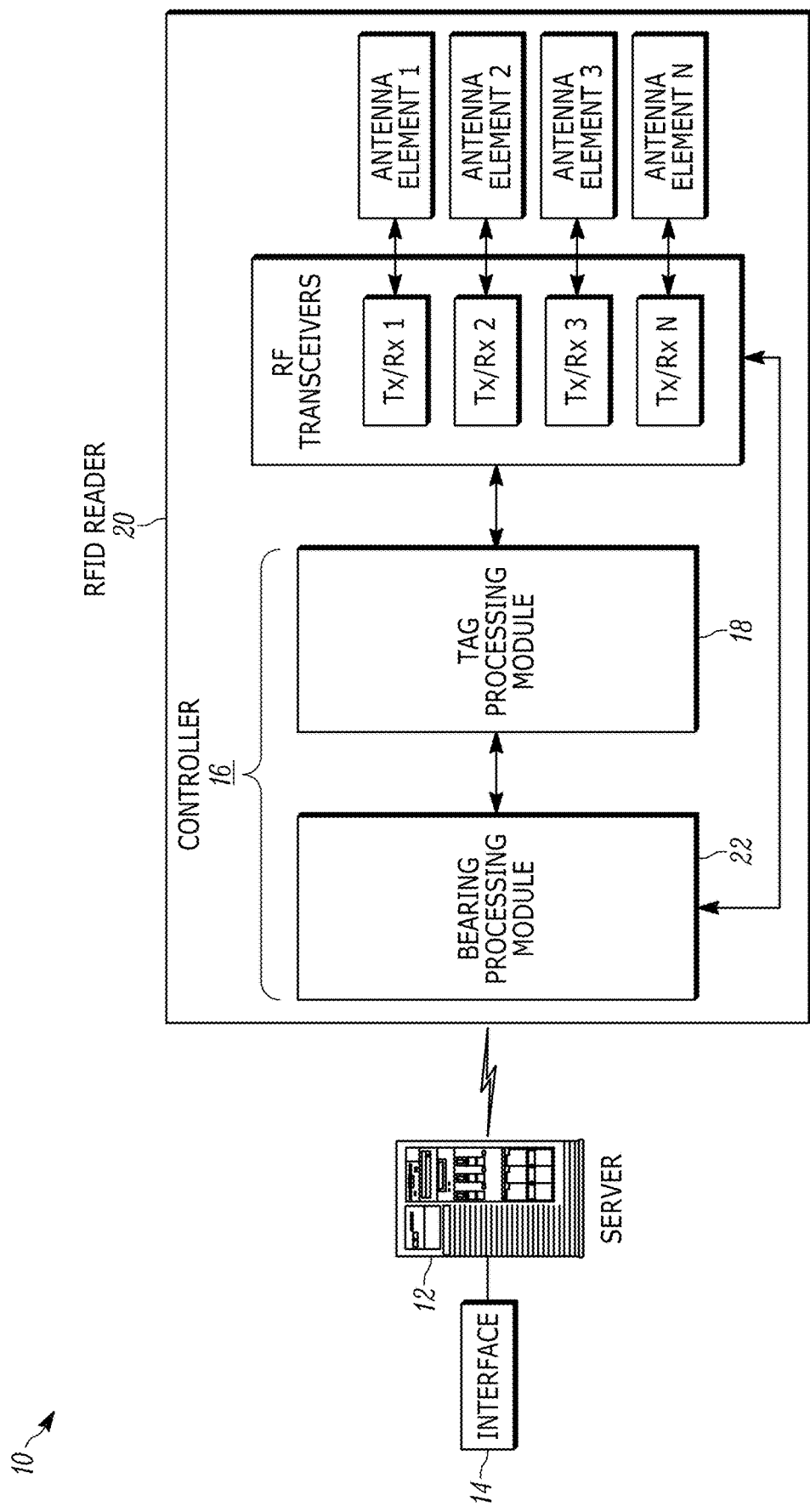
FIG. 1 is a schematic view of an exemplary arrangement for estimating bearings of RFID tag in accordance with the present disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Referring to the drawings, FIG. 1 depicts a simplified depiction of a radio frequency (RF) identification (RFID) tag reading system 10 for accurately determining bearings of RFID tags associated with items to be tracked or monitored. The system 10 has an RFID reader 20, with a housing, connected to a server or host 12 and a user interface 14. In the present disclosure, either the RFID reader 20 or the system 10 may be considered an "arrangement." The RFID reader 20 has an array of antenna elements 1, 2, 3 . . . , N, preferably a phased array. In some embodiments, at least one of the antenna elements 1, 2, 3 . . . , N is an omnidirectional antenna element. In other embodiments, the entire array of antenna elements 1, 2, 3 . . . , N is comprised of omnidirectional antenna elements. The RFID reader 20 also has a plurality of RF transceivers Tx/Rx 1, Tx/Rx 2, Tx/Rx 3, . . . , Tx/Rx N, one transceiver for, and connected to, each antenna element. The number N is arbitrary and depends on the particular application. By way of non-limiting example, fourteen antenna elements and fourteen transceivers may be employed. Although FIG. 1 depicts one transceiver for each antenna element, this need not be the case. The number of transceivers may be different from the number of antenna elements. For example, a particular transceiver may be shared with two or more antenna elements. In some embodiments, a collection of transceivers, separate from antenna elements, may be referred to as a "transceiver assembly." Also, in some embodiments, a "transceiver assembly" may be used to refer to a collection of transceivers together with their respectively coupled antenna elements.

A controller or programmed microprocessor 16 is operatively connected to the transceivers to control their operation in one or more scans or modes of operation, as described below. The controller 16 executes a software-based, tag processing module 18 and also executes a software-based, bearing processing module 22. The modules 18 and 22 need not be software-based, but either or both of them could be hardware-based, or could be implemented in both software and hardware. Although the bearing processing module 22 is depicted in FIG. 1 as being implemented in the RFID reader 20, it will be understood that the bearing processing module 22, either in whole or in part, can also be implemented in the server 12. As such, in some embodiments, at least a portion of a controller may be situated separate from RFID reader 20.

Figure 2:
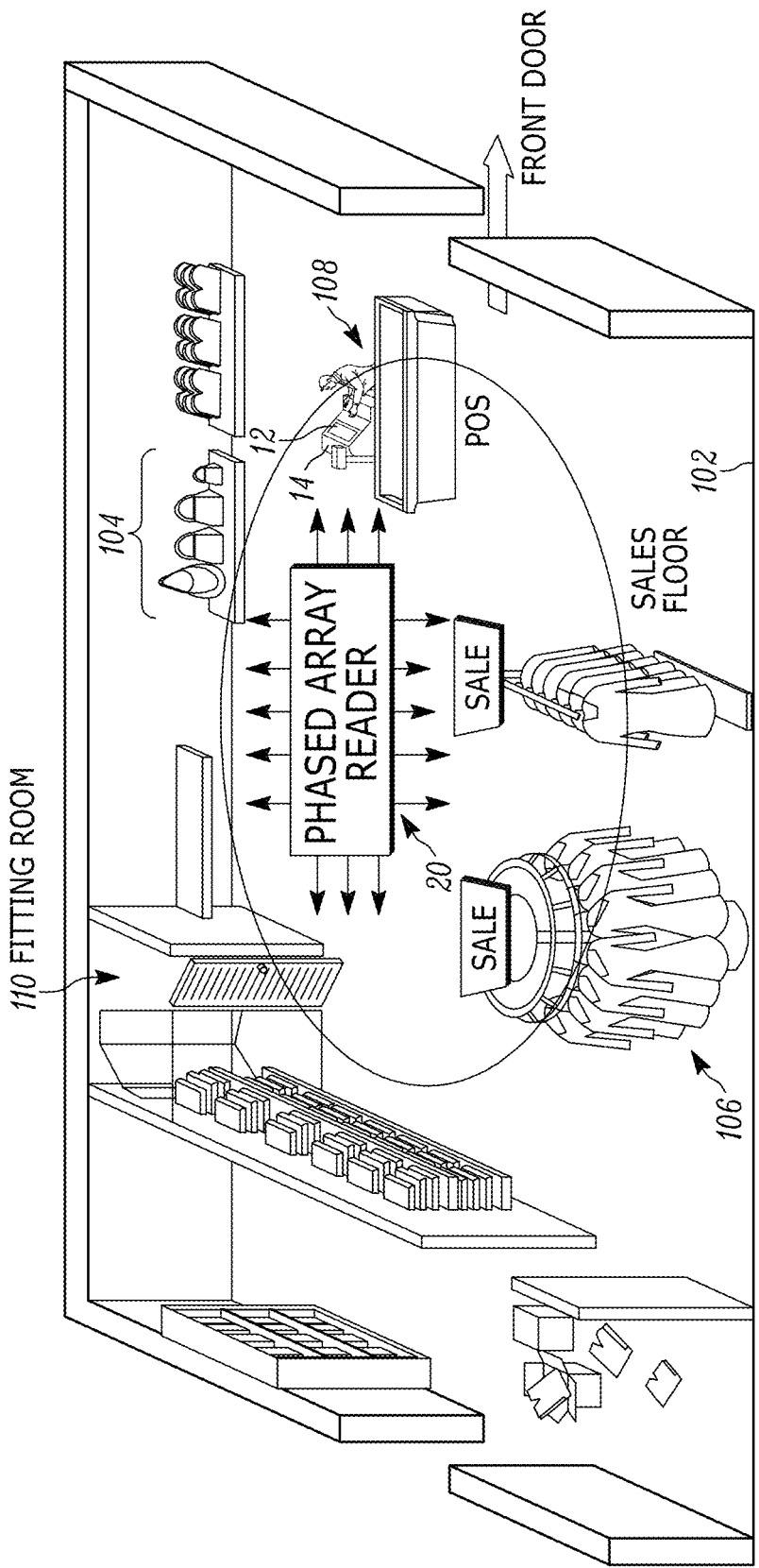
FIG. 2 is a perspective, schematic view of the system of FIG. 1 installed in an exemplary controlled area, especially for inventory control of RFID-tagged items.

FIG. 2 depicts an exemplary depiction of the RFID reader 20 deployed in a controlled area 102 of a retail sales floor having a point-of-sale (POS) station 108 at which the server 12 and the interface 14 may be provided, a fitting room 110, and a plurality of RFID-tagged items, e.g., clothes 106, handbags 104, etc., arranged on shelves, hangers, racks, on the floor, etc. in the controlled area 102. It will be understood that, in some applications, the server 12 is preferably located in a backroom, well away from the sales floor, or off-sight all together. Each RFID-tagged item 104, 106 is preferably associated with a passive RFID tag for cost reasons, although other types of RFID tags, as described above, may be employed. It will be further understood that, in some applications, for example, in a warehouse, each RFID tag is associated with a pallet or container for multiple items. To simplify the drawing, only one reader 20 has been illustrated, and the reader 20 has been illustrated as being preferably located overhead on the ceiling in the controlled area 102. It will be still further understood that more than one reader 20 could be deployed in the controlled area 102, and not necessarily deployed on the ceiling. Each reader 20 may be powered from an electrical outlet, powered over the Ethernet (POE), or can be battery powered.

The server 12 comprises one or more computers and is in wired, wireless, direct, or networked communication with the interface 14 and with the reader 20. The interface 14 provides a human/machine interface, e.g., a graphical user interface (GUI), that presents information in pictorial and/or textual form (e.g., representations of bearings of the RFID-tagged items 104, 106) to a human user, and to initiate and/or alter the execution of various processes that may be performed by the server 12 and/or by the controller 16. The server 12 and the interface 14 may be separate hardware devices and include, for example, a computer, a monitor, a keyboard, a mouse, a printer, and various other hardware peripherals, or may be integrated into a single hardware device, such as a mobile smartphone, or a portable tablet, or a laptop computer. Furthermore, the user interface 14 can be in a smartphone, or tablet, etc., while the server 12 may be a computer, either located at a controlled area 102 (see FIG. 2) containing the RFID-tagged items 104, 106, or remotely at some other location, or can be hosted in a cloud server. The server 12 can include a wireless RF transceiver that communicates with the reader 20. For example, Wi-Fi and Bluetooth® are open wireless standards for exchanging data between electronic devices.

Figure 3A:
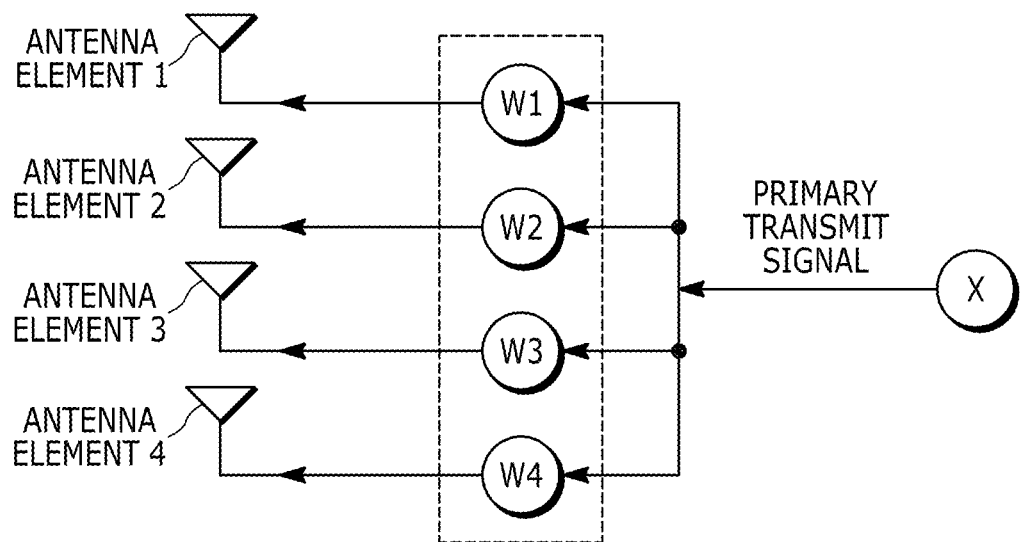
FIG. 3A is a schematic diagram depicting components of the overall system of FIG. 1 during transmission of the primary transmit signal.
Figure 3B:
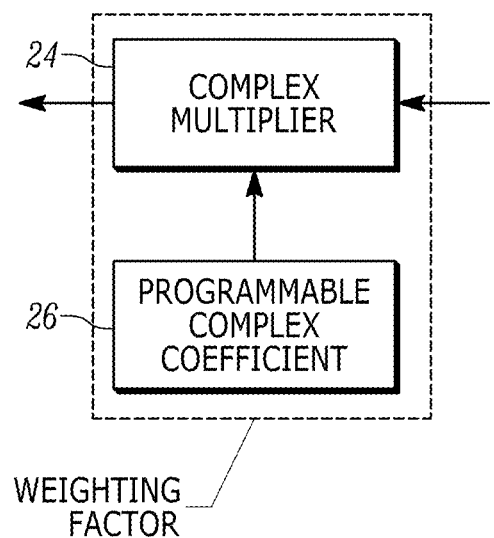
FIG. 3B is a block diagram depicting a detail of a weighting factor component for use in beam/signal steering in the system.

During execution of an RFID tag scan, the controller 16 executes the tag processing module 18 by which the transceivers are commanded to act as a primary transmit beam steering unit operative for steering a primary transmit beam over the controlled area 102 by transmitting a primary transmit signal (X) via the antenna elements to each tag. As used in the present disclosure, the terms "beam(s)" and "signal(s)" may be used synonymously and interchangeably. As shown in FIG. 3A, the primary transmit signal (X) is conducted along different channels (in this example, four) to a plurality of the antenna elements 1, 2, 3 and 4. Steering is accomplished by introducing a different weighting factor W1, W2, W3 and W4 on each channel. Thus, antenna elements 1, 2, 3, and 4 may be viewed as a phased array. As shown in FIG. 3B, each weighting factor is generated by a complex multiplier 24 and a programmable device 26 that sets a complex coefficient for the complex multiplier 24 to effect baseband steering of the primary transmit beam. Baseband steering of the primary transmit beam by setting a complex coefficient for each complex multiplier 24 is known, and details thereof can be obtained, for example, by reference to U.S. Pat. No. 8,587,495 and/or to "A Primer on Digital Beamforming", by Toby Haynes, in Spectrum Signal Processing, Mar. 26, 1998, the entire contents of said patent and said primer being incorporated herein by reference thereto.

Figure 4:
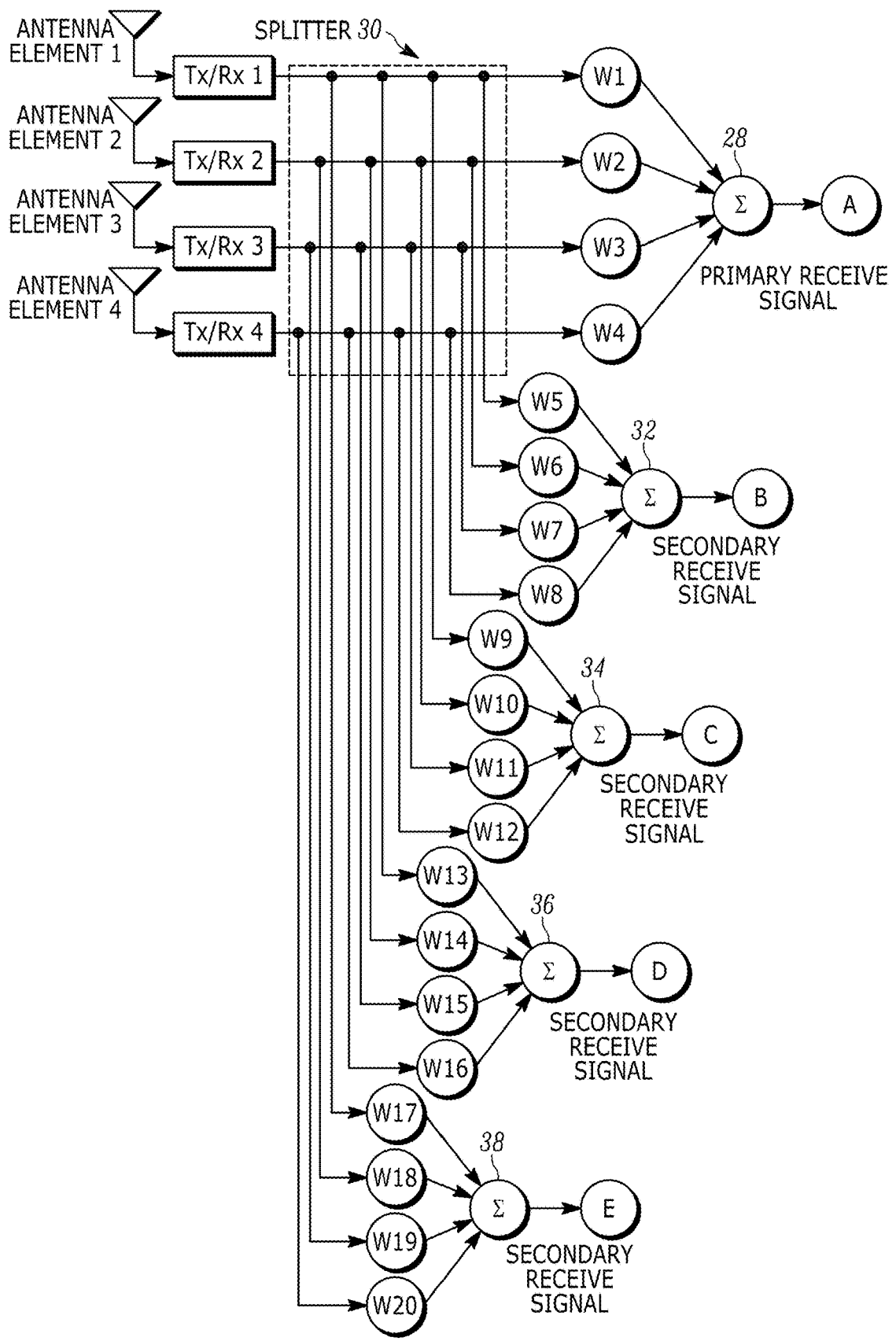
FIG. 4 is a schematic diagram depicting components of the overall system of FIG. 1 during reception of the primary receive signal, as well as of additional secondary receive signals.

During the scan, the controller 16 also executes the tag processing module 18 by which the transceivers are commanded to act as a primary receive beam steering unit operative for steering a primary receive beam at a primary steering angle by receiving a primary receive signal (A) via the antenna elements from each tag. In other words, the transceivers are commanded to receive a primary receive signal from along a predetermined direction (steering angle). As used in the present disclosure, references to receiving a signal(s) from or along a specific direction or angle should be understood to encompass sampling and/or determining a signal(s) from or along a specific direction or angle. Likewise, references to receiving a signal(s) from, along, or over a specific range (angular or otherwise) should be understood to encompass sampling and/or determining a signal(s) from, along, or over a specific range (angular or otherwise). As shown in FIG. 4, the antenna elements 1, 2, 3 and 4 receive return signals from each interrogated tag along different channels (in this example, four), and then a different weighting factor W1, W2, W3 and W4 is introduced on each channel before all the weighted return signals are summed in an adder 28 in order to generate the primary receive signal (A). Each weighting factor is generated by the circuit of FIG. 3B, which may or may not be considered to be a part of a transceiver assembly and/or a part of the controller. The sampling angle/direction of the primary receive signal is affected by the weighting factors W1, W2, W3 and W4. As illustrated, the weighting factors (FIG. 4) used in steering the primary receive signal is, in a preferred embodiment, the same as the weighting factors (FIG. 3A) used in steering the primary transmit signal. As a result, the steering angle for both the primary transmit signal and the primary receive signal is the same, or nearly so, i.e., they have a common boresight or general bearing. However, it will be understood that the weighting factors used in steering the primary receive signal may be different from the weighting factors used in steering the primary transmit signal, in which case, the steering angle for the primary transmit signal is different from the steering angle for the primary receive signal. The combination of the primary transmit signal and the primary receive signal are used by the RFID reader to communicate with an interrogated RFID tag pursuant to some predetermined protocol. Commonly, such communication can include reading the payload of the RFID tag and/or transmitting information to the RFID tag for recordation thereon.

Figure 5A:
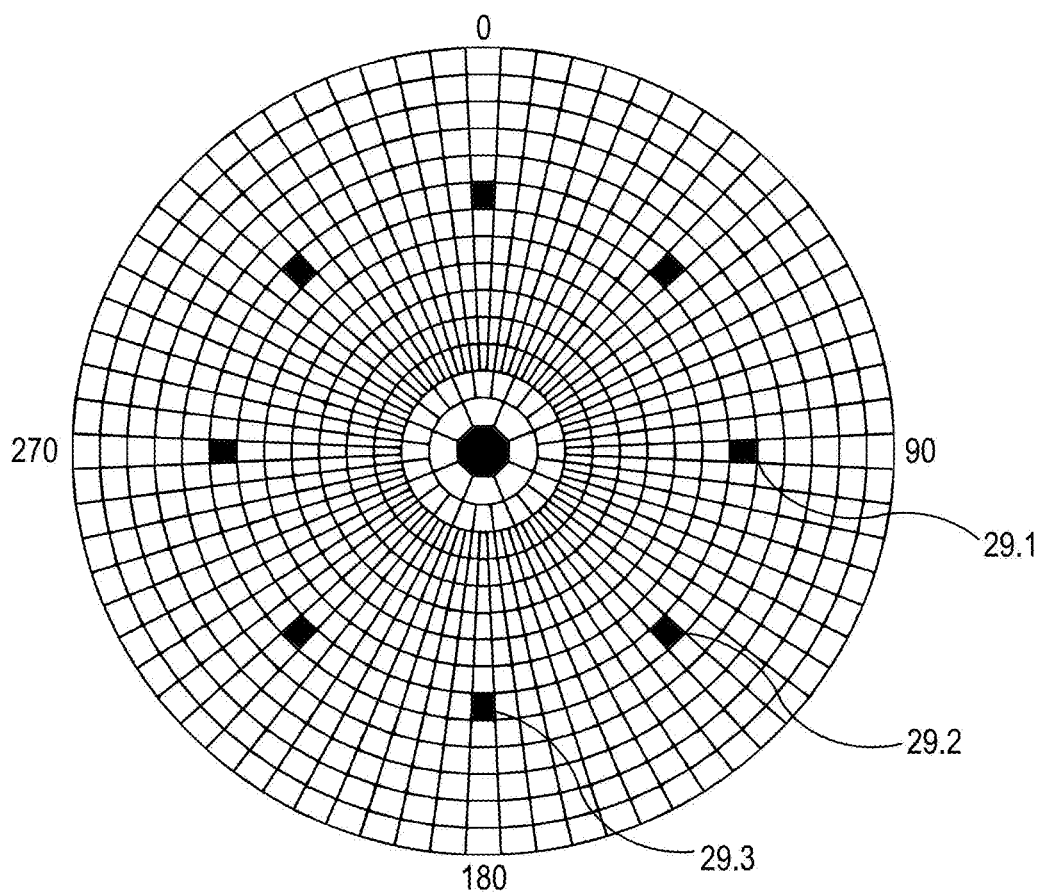
FIG. 5A is an exemplary polar diagram depicting an exemplary aim pattern of primary transmit signals transmitted by the system of FIG. 1.

FIG. 5A illustrates an exemplary polar diagram showing an exemplary aim pattern of primary transmit beams transmitted by an individual RFID readers 20. For such embodiments, it is assumed that the RFID reader is mounted in an overhead fashion, similar or same to the configuration of FIG. 2. The diagram extends over a 360-degree azimuth range and over a 70-degre elevation range with zero-degree elevation reference direction being at the center of the diagram, the 70-degree elevation direction being at the outer-most periphery of the diagram, and each concentric circle representing a change of 5 degrees in elevation relative to any adjacent circle. As can be seen in the diagram, the RFID reader can be configured to emit a plurality of (in this case nine) primary transmit beams based on primary transmit signals with each of the beams having its main lobe directed in a predefined azimuth and elevation direction 29.1, 29.2, . . . 29.*n*. For example, the primary transmit beam directed at 29.1 is transmitted in direction having an approximate bearing of 90 degrees azimuth and 45 degrees elevation.

Referring back to FIG. 4, the return signals from each interrogated tag from the antenna elements 1, 2, 3 and 4 are conducted through respective RF transceivers Tx/Rx 1, Tx/Rx 2, Tx/Rx 3, Tx/Rx 4, to a splitter 30 (which may or may not be considered to be a part of a transceiver assembly and/or a part of the controller), and then routed to four sub-circuits (which may or may not be considered to be a part of a transceiver assembly and/or a part of the controller) to simultaneously generate four different secondary receive signals, each being sampled from a predetermined direction, as described below. Thus, the return signals are conducted from the splitter 30 to weighting factors W5, W6, W7 and W8 before being summed in an adder 32 to generate a secondary receive signal (B), to weighting factors W9, W10, W11 and W12 before being summed in an adder 34 to generate a secondary receive signal (C), to weighting factors W13, W14, W15 and W16 before being summed in an adder 36 to generate a secondary receive signal (D), and to weighting factors W17, W18, W19 and W20 before being summed in an adder 38 to generate a secondary receive signal (E). Put another way, the return signal from antenna element 1 is conducted through transceiver Tx/Rx 1 to weighting factors W1, W5, W9, W13 and W17; the return signal from antenna element 2 is conducted through transceiver Tx/Rx 2 to weighting factors W2, W6, W10, W14 and W18; the return signal from antenna element 3 is conducted through transceiver Tx/Rx 3 to weighting factors W3, W7, W11, W15 and W19; and the return signal from antenna element 4 is conducted through transceiver Tx/Rx 4 to weighting factors W4, W8, W12, W16 and W20. While the combination of the primary transmit signal and the primary receive signal may be used by the RFID reader primarily for communication with an interrogated RFID tag pursuant to some predetermined protocol, secondary receive signals may be employed to monitor and/or determine the strength of a signal (e.g., RSSI) being received from any one RFID tag and ultimately used for bearing estimation.

In the currently described embodiment, each weighting factor W5 through W20 is generated by a circuit identical or similar to that depicted in FIG. 3B. However, it is to be understood that other circuits can be used to generate other and/or additional weighing factors. Each set of weighing factors W5-W8, W9-W12, W13-W16, and W17-W20 can be selected to sample each respective secondary receive signal from a predetermined direction defined by a certain azimuth and elevation angle value. By that virtue, generating other and/or additional weighing factors can provide the ability to sample any one of a plurality of secondary receive signals from a desired direction.

Thus, four secondary receive signals can be been formed. It will be understood, however, that this disclosure is not intended to be limited to a group of four antenna elements, four secondary receive signals, four weighting factors for each secondary receive signal, and/or twenty weighting factors in total. Different numbers or groups of antenna elements, different number of weighing factors, different numbers or groups of secondary receive signals, etc. could be employed. For example, with an appropriate number of transceivers and antenna elements, and an appropriate number of circuits generating an appropriate number of weighting factor, it is possible to generate a plurality of secondary receive signals where that plurality samples signals from a relatively broad angular spectrum across both azimuth and elevation. Such a broad coverage is exemplified by FIGS. 5B and 5C which provide exemplary heatmaps, represented via polar diagrams, of an RFID tag response as determined from a plurality of secondary receive signals. Each heatmap is based on the RSSI levels of a signal received across a plurality of directions defined by bounded areas, each of which is defined by predetermined azimuth and elevation values. Furthermore, each bounded area is representative of one secondary receive signal received from a respective direction having an azimuth and elevation value or being bound by a set of azimuth and elevation values. To view it another way, each heatmap is based on a plurality of secondary receive signals, where each secondary receive signal is received from a respective direction having a respective azimuth and elevation bearing (represented by the individually bounded areas within each heatmap) and a respective polarization, and each secondary receive signal is used to determine the signal strength of an RFID tag response as it is measured along the respective direction of the given secondary receive signal. The determined signal strengths can then be used (by, for example, the bearing processing module 22) in the estimation of a bearing of the responding RFID tag. While some approaches may rely on using all the determined signals strengths, other approaches may rely on only some of those signal strengths (e.g., the strongest signal strength) to estimate the bearing. In the example of the latter case, the estimated bearing of the RFID tag may be associated with the bearing of the secondary receive signal with the greatest receive signal strength.

In certain situations, like environments with multipath, using the RFID system 10 in the manner described above may provide false/inaccurate direction readings. This may be so as in some cases RFID tags will backscatter their signals in ways that depend on the direction of the interrogation signal. Thus, there are instances where a primary transmit interrogation beam will reach an RFID tag from a non-direct path, causing that RFID tag to become active and transmit its response signal in a way that would cause a stronger component of the response signal to take a multipath to the RFID reader. In this case, relying on the strongest RSSI of the receive signal to determine the direction of an RFID tag, alone, would result in a false reading since the strongest signal would arrive at the RFID reader from the direction of the reflection and not from the direction of the RFID tag. Combining these direction-finding results with others where the strongest RSSI of the receive signal come directly from the tag via a direct path can cause the RFID tag to appear in multiple directions.

Figure 5B:
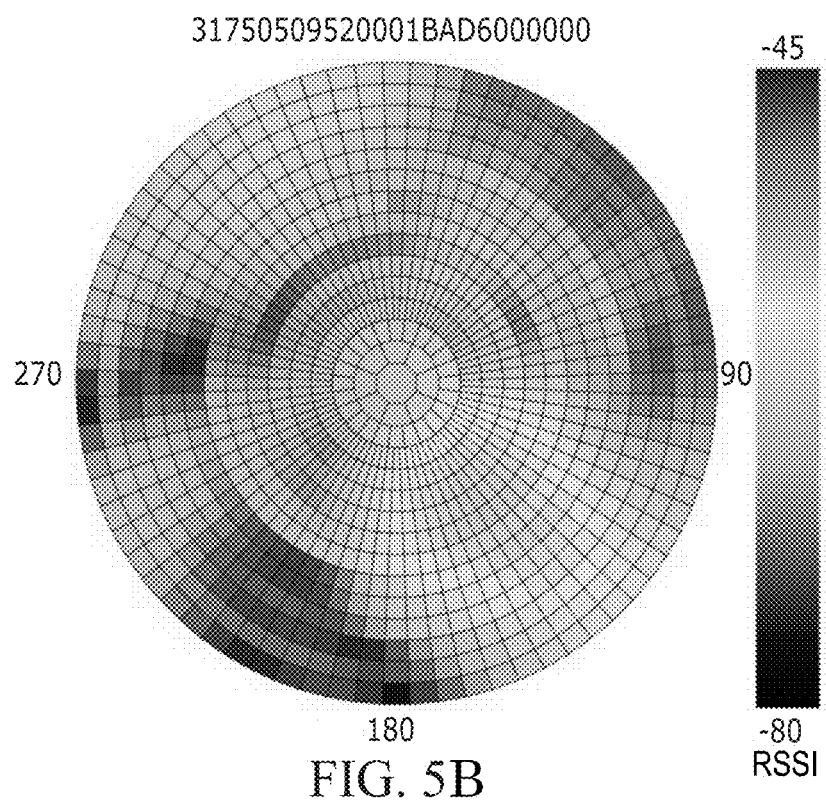
FIGS. 5B and 5C are exemplary heatmaps of RFID tag responses.
Figure 5C:
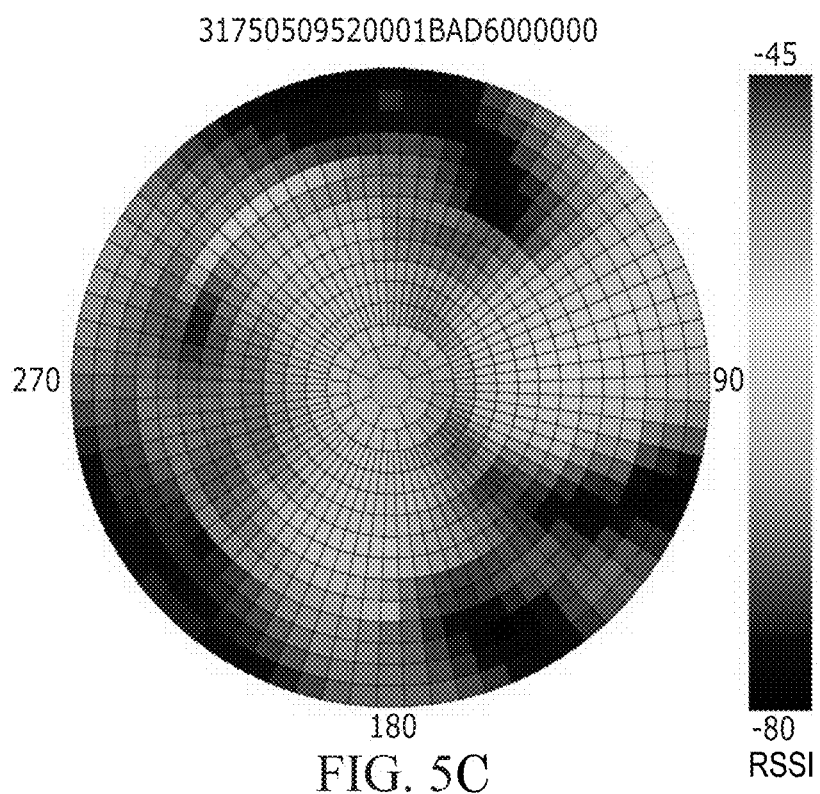

An example of this discrepancy can be explained with reference to exemplary FIGS. 5B and 5C. One can assume that FIG. 5B illustrates an exemplary heatmap of an RFID tag response when the primary transmit beam is transmitted in a first direction (e.g., 0 degrees azimuth and 45 degrees elevation) and FIG. 5C illustrates an exemplary heatmap of an RFID tag response of the same RFID tag as detected in FIG. 5B when the primary transmit beam is transmitted in another, second direction (e.g., 90 degrees azimuth and 45 degrees elevation). Assuming the RFID reader used to generate the heatmaps of FIGS. 5B and 5C is mounted overhead and operative to obtain readings from underneath, the RFID reader can be exemplarily configured such that a signal represented at the center of each heatmap is a signal having a bearing/direction of 0 degrees elevation and no azimuth component, and a signal represented at the periphery of each heatmap is a signal having a bearing/direction of 70 degrees elevation and a respective azimuth component. With such a configuration, evaluating FIG. 5B, it is apparent that the maximum RSSI value of the heatmap is associated with a signal having a direction in the region of 135 degrees azimuth and 30 degrees elevation. On the other hand, evaluating FIG. 5C, it is apparent that the maximum RSSI value of that heatmap is associated with a signal having a direction in the region of 80 degrees azimuth and 35 degrees elevation. As a result, associating the direction of the RFID tag with the direction of the strongest response signal will cause a discrepancy in the result, with one heatmap indicating a first direction and the other heatmap indicating a second, different direction.

To address this problem, the RDIF system 10 can be configured such that upon a detection of a variance in the direction of a maximum RSSI value for a given RFID tag in response to a plurality of interrogation signals transmitted by an RFID reader over a respective plurality of different directions, the RFID reader retransmits the plurality of interrogation signals over the respective plurality of different directions with successively lower power levels until the only response(s) being received no longer exhibit the previously detected variance.

Such an approach relies on the notion that at some point, the power of the interrogation signal will only be sufficient to power the RFID tag via a direct line-of-sight (LOS) transmission and not via a reflected transmission. This is due to the likely potential of signal degradation upon reflection and a more-distant path to the RFID tag via the multipath. As such, in some instances, despite the emission power being the same, the power level reaching an RFID tag from an interrogation signal transmitted directly at the RFID tag will be greater than the power level reaching that same RFID tag from an interrogation signal transmitted in a direction of a reflection point. Thus, lowering the power on the primary transmit signals to the point where a tag responds to one transmission and does not respond to another transmission can eliminate responses resulting from a multipath interrogation signal. From this, one may establish some confidence level that an RFID tag responding in response to a direct interrogation signal will register its strongest RSSI level, as seen by the RFID reader, along a direct path also. From this, one may also rely on the directionality of the strongest RSSI in establishing the direction of the RFID tag with a lower probability that the direction of the strongest RSSI is a result of a multipath and a higher probability that the direction of the strongest RSSI is a result of a direct path.

Figure 6:
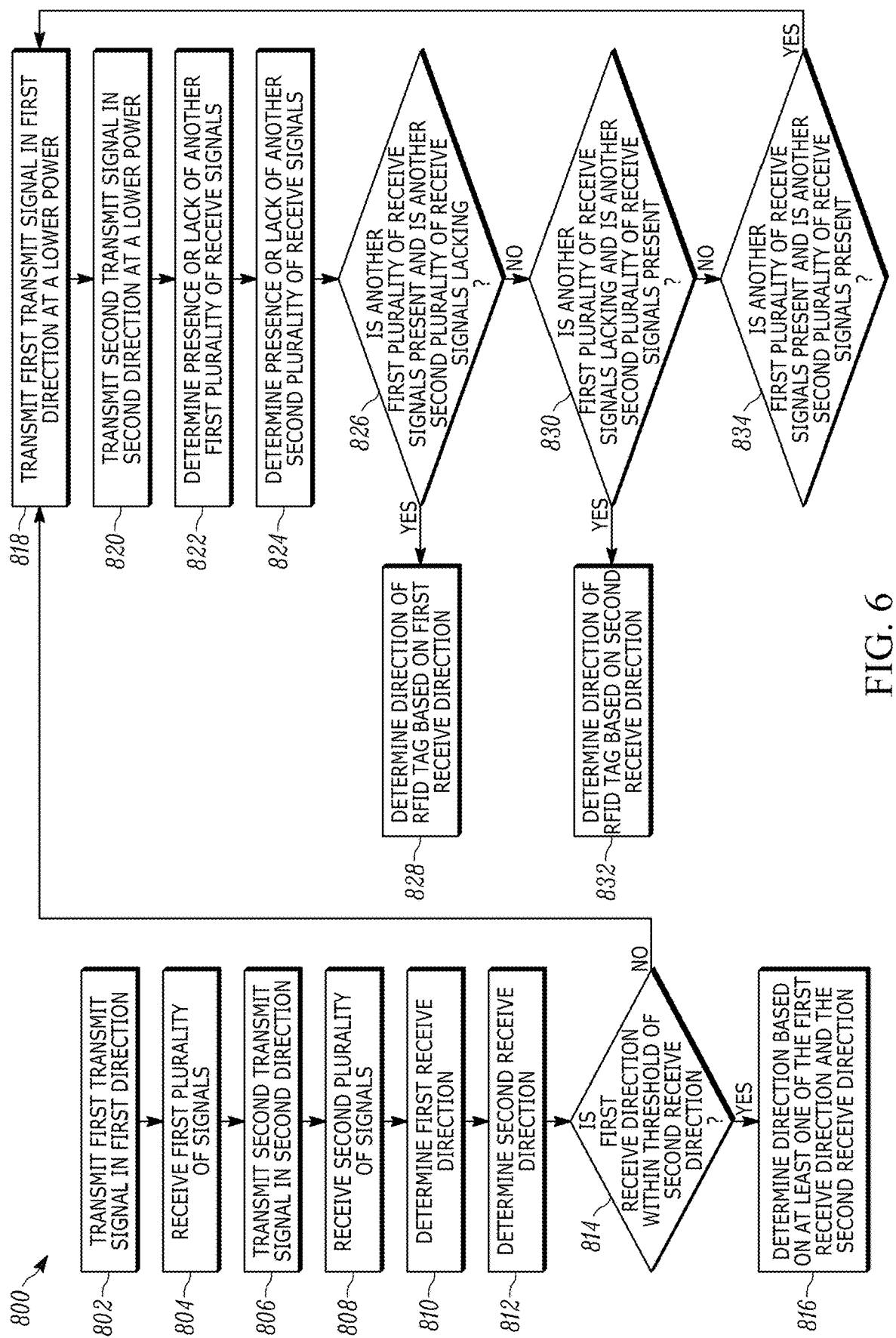
FIG. 6 is a flowchart representative of a method of estimating a location of an RFID tag in accordance with an embodiment of the present invention.
Figure 7:
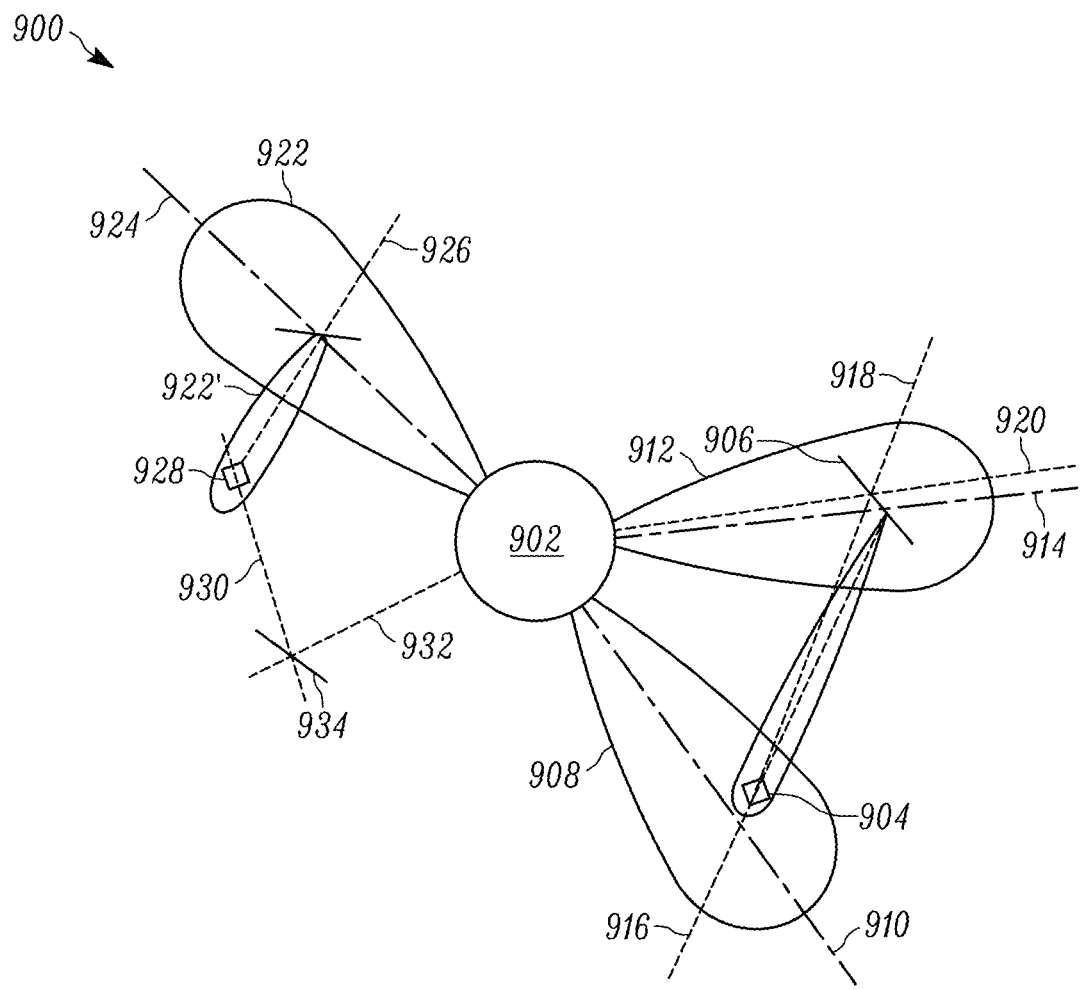
FIG. 7 is a plan view of an exemplary RFID reader arrangement for implementing the method of FIG. 8 in accordance with an embodiment of the present invention.

The aforementioned approach may be implemented via an exemplary method 800 described in FIG. 6 with reference to an exemplary arrangement 900 illustrated, via a top view, in FIG. 7 which includes an RFID reader 902, an RFID tag 904, and a signal-reflective surface 906. Method 800 begins with transmitting 802, via the RFID reader 904, a first transmit signal 908 in a first transmit direction 910. Next, the RFID reader 902 receives 804 a first plurality of receive signals generated in response to the first transmit signal 908. As described previously, a phased array of antenna elements within the reader 904 can be configured to steer its receive beam (in other words sample an incoming beam) over a plurality of directions. This plurality of receive signals, as received by the RFID reader, can be represented via a heatmap, like the one shown in FIG. 5B, where each of the first plurality of receive signals has a respective first-receive-signal strength and is received from one of a plurality of receive directions. Next, the RFID reader 902 transmits 806 a second transmit signal 912 in a second transmit direction 914. Upon transmitting the second transmit signal, the RFID reader 902 receives 808 a second plurality of receive signals generated in response to the second transmit signal 912. This plurality of receive signals, as received by the RFID reader, can be represented via a heatmap, like the one shown in FIG. 5C, where each of the first plurality of receive signals has a respective second-receive-signal strength and is received from one of a plurality of receive directions. As will be noted, the receive directions for both the first plurality of receive signals and the second plurality of receive signals is the same. In essence, the RFID tag response is being read/sampled over the same range of directions.

In case of the second transmit signal 912 and the resulting tag response, it can be seen in FIG. 7 that signal 912 impinges on a reflective surface 906 and thereafter travels in the direction 916 of the tag 904. This may cause the RFID tag 904 to respond in a way that the majority of its response signal strength will be transmitted toward the reflective surface 906 along first response direction 918, reflected off the reflective surface 906, and transmitted toward the RFID reader 902 along a second response direction 920 causing the RFID reader 902 to interpret the strongest RSSI as coming from direction 920. It should be appreciated that while in FIG. 7, the interrogation and the tag response signals are both illustrated as taking a substantially same multipath and being reflected by the same reflective surface, this does not have to be the case. In some embodiments, an interrogation signal 922 and 922' may take a first multipath along directions 924, 926 and cause the RFID tag 928 to transmit its response signal primarily along a separate, unrelated multipath along directions 930, 932 toward an RFID reader 902 via a reflective surface 934.

Upon receiving the first plurality of receive signals and the second plurality of receive signals, the method further includes the operations of determining 810 a first receive direction, where the first receive direction is associated with one of the first plurality of receive signals having a maximum first-receive-signal strength, and determining 812 a second receive direction, the second receive direction being associated with one of the second plurality of receive signals having a maximum second-receive-signal strength. Another way to view the determination of the first and second receive signals is to locate the global maxima in the heatmaps of FIGS. 5B and 5C, with the global maximum RSSI of the heatmap of FIG. 5B corresponding to the first receive direction and the global maximum RSSI of the heatmap of FIG. 5C corresponding to the second receive direction. As noted previously, using the exemplary heatmaps of FIGS. 5B and 5C, the first receive direction would be associated with the region at 135 degrees azimuth and 30 degrees elevation, and the second receive direction would be associated with region at 80 degrees azimuth and 35 degrees elevation. It should be understood that the determination of the particular direction does not necessarily have to follow a transmission of all the interrogation signals and the sampling of all responses. In other words, the receive direction determination for each respective interrogation and response combination may be determined immediately after the receipt of the response and prior to the transmission of a following interrogation and response combination.

After the first and second receive directions have been determined, they are compared 814 against each other to see if the difference between the first receive direction and the second receive direction is within a predetermined threshold. In some embodiments, the threshold is an angular difference in three-dimensional space of 15 degrees. In some embodiments, the threshold is an angular difference in three-dimensional space of between 5 degrees and 15 degrees.

If it is determined that the difference between the first receive direction and the second receive direction is within the predetermined threshold, the method 800 determines 816 an estimated direction of the RFID tag 904 based on at least one of the first receive direction and the second receive direction. In some embodiments this can be done by equating the estimated direction of the RFID tag with one of (i) the first receive direction, (ii) the second receive direction, and (iii) an average receive direction based on the first receive direction and the second receive direction.

Conversely, if it is determined that the difference between the first receive direction and the second receive direction exceeds the predetermined threshold (as is the case with the respective directions of receive signals represented in FIGS. 5B and 5C), the method 800 proceeds with retransmitting the plurality of interrogation signals over the respective plurality of different directions with successively lower power levels until the only response being received no longer exhibit a directional variance that exceeds the threshold. In particular, in step 818, the reader 902 transmits another first transmit signal in the first transmit direction 910, where this another first transmit signal is transmitted at a lower power level than an immediately precedingly transmitted first transmit signal. Additionally, in step 820, the reader 902 transmits another second transmit signal in the second transmit direction 914, where this another second transmit signal is transmitted at a lower power level than an immediately precedingly transmitted second transmit signal. Assuming, for example, that the initial transmission of the first transmit signal 908, as described with reference to step 802, was 30 dB, the first retransmission of that signal (i.e., the another first transmit signal) would be transmitted at a power level that is lower than 30 dB. In some embodiments, the first and subsequent drop in power is approximately 3 dB. In this case, the first retransmission of the first transmit signal 908 would be at 27 dB, the second retransmission would be at 24 db, the third retransmission would be at 21 db, and so on. It will be understood that the same approach in power reduction exemplarily applies to the another second transmit signal. In some embodiments, the first and subsequent drop in power is approximately between 1 dB and 3 dB. In some embodiments, the drop in power can be maintained with each subsequent retransmission. In some embodiments, the drop in power can be decreased with each successive retransmission. Additionally, it is preferable to maintain the same power level between the first transmit signal and second transmit signal, both during the initial transmission and also with each subsequent reduction in power. Thus, if the initial transmit power is at 30 dB and each successive reduction in power is 3 dB, the first transmission of the first transmit signal 908 and the second transmit signal 912 will be at 30 dB, respectively, the second transmission (i.e., the first retransmission) of the first transmit signal 908 and the second transmit signal 912 will be at 27 dB, respective, the third transmission (i.e., the second retransmission) of the first transmit signal 908 and the second transmit signal 912 will be at 24 dB, respective, and so on.

Upon retransmitting the first and second transmit signals in steps 818, it is then possible to determine 822 either a presence or a lack of another first plurality of receive signals received at the RFID reader 902 in response to the another first transmit signal transmitted at step 818, and determine 824 either a presence or a lack of another second plurality of receive signals received at the RFID reader 902 in response to the another second transmit signal transmitted at step 818. In some embodiments, the detection (or lack) of another response can be based on the ability (or lack thereof) to successfully decode data transmitted by an RFID tag. In some embodiments, the detection (or lack) of another response can be based on the maximum RSSI having a signal strength that is equal to or greater than some predetermined threshold. It should be understood that the determination of a presence or a lack of a response does not have to occur after the transmission of all signals. In some embodiments, this determination may be made immediately after a transmission of each interrogation signal, such that step 822 may follow step 818 and step 824 may follow step 822.

If it is determined 826 that, responsive to the transmission of the another first transmit signal, the RFID reader 902 receives another first plurality of receive signals, and that further, responsive to the transmission of the another second transmit signal, the RFID reader 902 does not received another second plurality of receive signals, the method 800 includes the determination 828 of the estimated direction of the RFID tag based on the first receive direction. In some embodiments, the determination 828 of the estimated direction of the RFID tag based on the first receive direction includes equating the estimated direction of the RFID tag with the first receive direction. Such a response to the another first transmit signal and non-response to the another second transmit signal can be viewed as being indicative of the another second transmit signal being a multipath signal with its path being such that the adjusted power level of the interrogation signal was insufficient to activate the tag. Hence, determining 828 the estimated direction of the RFID tag based on the first receive direction may expressly disregard the second receive direction, or otherwise rely on it with the understanding that it is likely a multipath direction, and thus, should be factored in as such. Additionally, the response to the another first transmit signal and non-response to the another second transmit signal can be viewed as being indicative of the another first transmit signal being a direct path signal with its path being such that the adjusted power level of the interrogation signal, while insufficient to activate the tag with via a non-direct path, was sufficient to activate the tag via a direct path. Consequently, the potential existence of a direct path can further be advantageously leveraged and the direction of the RFID tag can be associated with the first receive direction as it is then likely that the highest RSSI receive signal received by the RFID reader is a direct signal from the tag.

Conversely, if it is determined 830 that, responsive to the transmission of the another first transmit signal, the RFID reader 902 does not receive another first plurality of receive signals, and that further, responsive to the transmission of the another second transmit signal, the RFID reader 902 does receive another second plurality of receive signals, the method 800 includes the determination 832 of the estimated direction of the RFID tag based on the second receive direction. In some embodiments, the determination 828 of the estimated direction of the RFID tag based on the second receive direction includes equating the estimated direction of the RFID tag with the second receive direction. Such a response to the another second transmit signal and non-response to the another first transmit signal can be viewed as being indicative of the another first transmit signal being a multipath signal with its path being such that the adjusted power level of the interrogation signal was insufficient to activate the tag. Hence, determining 832 the estimated direction of the RFID tag based on the second receive direction may expressly disregard the first receive direction, or otherwise rely on it with the understanding that it is likely a multipath direction, and thus, should be factored in as such. Additionally, the response to the another second transmit signal and non-response to the another first transmit signal can be viewed as being indicative of the another second transmit signal being a direct path signal with its path being such that the adjusted power level of the interrogation signal, while insufficient to activate the tag with via a non-direct path, was sufficient to activate the tag via a direct path. Consequently, the potential existence of a direct path can further be advantageously leveraged and the direction of the RFID tag can be associated with the second receive direction as it is then likely that the highest RSSI receive signal received by the RFID reader is a direct signal from the tag.

If it is determined 834 that, responsive to the transmission of the another first transmit signal, the RFID reader 902 does receive another first plurality of receive signals, and that further, responsive to the transmission of the another second transmit signal, the RFID reader 902 does receive another second plurality of receive signals, the method 800 returns to step 818 to continue retransmitting the plurality of interrogation signals over the respective plurality of different directions with successively lower power levels until the only response being received no longer exhibit a directional variance that exceeds the threshold.

Figure 8:
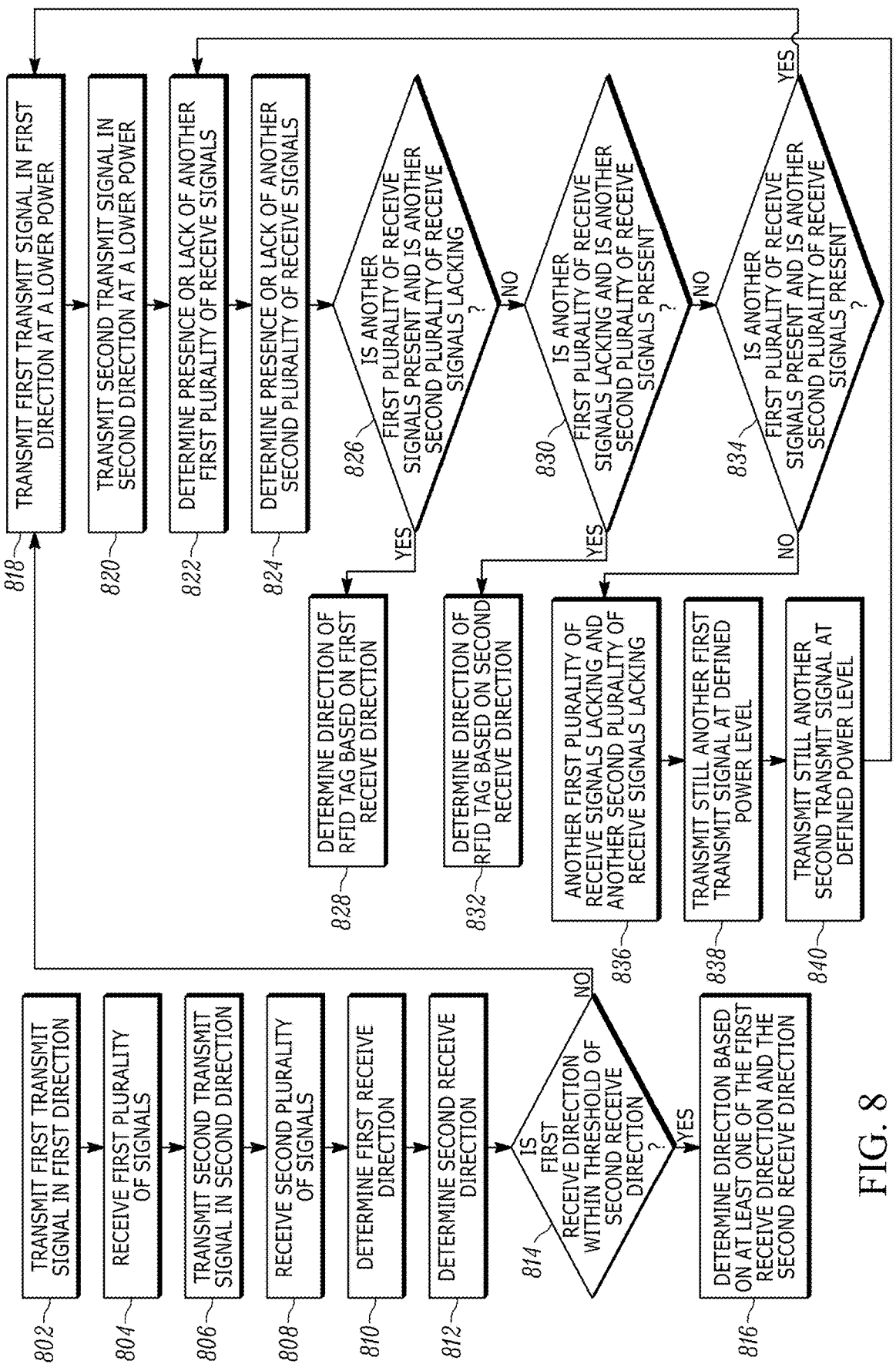
FIG. 8 is a flowchart representative of a method of estimating a location of an RFID tag in accordance with an embodiment of the present invention.

Referring to FIG. 8, in some embodiments, is may be desirable to also monitor for an instance where upon a successive drop in the power of the interrogation signal, the RFID reader receives no responses at all. This may occur signal degradation along the multipath and along the direct path is similar and that the predetermined reduction in power (e.g., 3 dB) was significant enough to prevent activating the tag via both the multipath and the direct path. In this case, the lack of another first plurality of receive signals being received at the RFID reader 902 in response to the transmission of the another first transmit signal and the lack of another second plurality of receive signals being received at the RFID reader 902 in response to the transmission of the another second transmit signal, 836, is indicative of too significant of a power drop in steps 818 and 822. To address this, the method 800 may further include step 838 where the RFID reader 902 transmits still another first transmit signal in the first transmit direction such that the still another first transmit signal is transmitted at a power level that is higher than a power level of the immediately precedingly transmitted first transmit signal and lower than a power level of a most-recent first transmit signal that cause a receipt of a first RFID tag response by the RFID reader. Additionally, the method 800 may further include step 840 where the RFID reader 902 transmits still another second transmit signal in the second transmit direction such that the still another second transmit signal is transmitted at a power level that is higher than a power level of the immediately precedingly transmitted second transmit signal and lower than a power level of a most-recent second transmit signal that cause a receipt of a second RFID tag response by the RFID reader. Thereafter the method returns to step 822 to evaluate responses to the signals transmitted in steps 838 and 840.

In some embodiments, the steps of the various methods described herein can be implemented by way of an RFID system having a housing with an antenna assembly positioned therein and operable to transmit and receive RF signals in the various ways described herein. Additionally, the system can include a controller (for example, comprised of a microprocessor, a memory, and a plurality of instructions stored in the memory that can be executed by the microprocessor) operatively connected to the antenna assembly and configured to enable the transmission and/or receipt of RF signals via the antenna assembly and to execute instructions to implement the various processes/ steps (including logic-based evaluation and manipulation of data) consistent with the present disclosure.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of estimating a direction of a radio frequency (RF) identification (RFID) tag, comprising:
    transmitting, by an RFID reader, a first transmit signal in a first transmit direction;
    receiving, at the RFID reader, a first plurality of receive signals generated in response to the first transmit signal, each of the first plurality of receive signals having a respective first-receive-signal strength and being received from one of a plurality of receive directions;
    transmitting, by the RFID reader, a second transmit signal in a second transmit direction that is different from the first transmit direction;
    receiving, at the RFID reader, a second plurality of receive signals generated in response to the second transmit signal, each of the second plurality of receive signals having a respective second-receive-signal strength and being received from one of the plurality of receive directions;
    determining a first receive direction, the first receive direction being associated with one of the first plurality of receive signals having a maximum first-receive-signal strength;
    determining a second receive direction, the second receive direction being associated with one of the second plurality of receive signals having a maximum second-receive-signal strength;
    comparing the first receive direction and the second receive direction;
    responsive to a difference between the first receive direction and the second receive direction being within a predetermined threshold, determining an estimated direction of the RFID tag based on at least one of the first receive direction and the second receive direction; and
    responsive to the difference between the first receive direction and the second receive direction exceeding the predetermined threshold:
        (a) transmitting, by the RFID reader, another first transmit signal in the first transmit direction, the another first transmit signal being transmitted at a lower power level than an immediately precedingly transmitted first transmit signal;
        (b) transmitting, by the RFID reader, another second transmit signal in the second transmit direction, the another second transmit signal being transmitted at a lower power level than an immediately precedingly transmitted second transmit signal;
        (c) determining one of a presence and a lack of another first plurality of receive signals received at the RFID reader in response to the another first transmit signal;
        (d) determining one of a presence and a lack of another second plurality of receive signals received at the RFID reader in response to the another second transmit signal;
        (e) responsive to the presence of the another first plurality of receive signals and the lack of the another second plurality of receive signals, determining the estimated direction of the RFID tag based on the first receive direction;
        (f) responsive to the lack of the another first plurality of receive signals and the presence of the another second plurality of receive signals, determining the estimated direction of the RFID tag based on the second receive direction; and
        (g) responsive to the presence of the another first plurality of receive signals and the presence of the another second plurality of receive signals, repeating (a)-(g).

2. The method of claim 1, wherein the operation of determining the estimated direction of the RFID tag based on the first receive direction includes equating the estimated direction of the RFID tag with the first receive direction, and wherein the operation of determining the estimated direction of the RFID tag based on the second receive direction includes equating the estimated direction of the RFID tag with the second receive direction.

3. The method of claim 1, wherein the predetermined threshold is between 5 degrees and 15 degrees.

4. The method of claim 1, wherein, responsive to the difference between the first receive direction and the second receive direction exceeding the predetermined threshold, the method further includes:
    (f.1) responsive to the lack of the another first plurality of receive signals and the lack of the another second plurality of receive signals:

transmitting, by the RFID reader, still another first transmit signal in the first transmit direction, the still another first transmit signal being transmitted at a power level that is higher than a power level of the immediately precedingly transmitted first transmit signal and lower than a power level of a most-recent first transmit signal that cause a receipt of a first RFID tag response by the RFID reader;

transmitting, by the RFID reader, still another second transmit signal in the second transmit direction, the still another second transmit signal being transmitted at a power level that is higher than a power level of the immediately precedingly transmitted second transmit signal and lower than a power level of a most-recent second transmit signal that cause a receipt of a second RFID tag response by the RFID reader; and repeating (c)-(g).

5. The method of claim 4, wherein the power level of the still another first transmit signal and the power level of the still another second transmit signal are approximately equal.

6. The method of claim 1, wherein a power level of the another first transmit signal and a power level of the another second transmit signal are approximately equal.

7. The method of claim 1, wherein, responsive to the difference between the first receive direction and the second receive direction being within the predetermined threshold, the operation of determining the estimated direction of the RFID tag based on at least one of the first receive direction and the second receive direction includes equating the estimated direction of the RFID tag with one of (i) the first receive direction, (ii) the second receive direction, and (iii) an average receive direction based on the first receive direction and the second receive direction.

8. The method of claim 1,
wherein the another first transmit signal being transmitted at the lower power level than the immediately precedingly transmitted first transmit signal includes the another first transmit signal being transmitted at a 1 dB to 3 dB lower power level than the immediately precedingly transmitted first transmit signal, and
wherein the another second transmit signal being transmitted at the lower power level than the immediately precedingly transmitted second transmit signal includes the another second transmit signal being transmitted at a 1 dB to 3 dB lower power level than the immediately precedingly transmitted second transmit signal.

9. A method of estimating a direction of a radio frequency (RF) identification (RFID) tag, comprising:
transmitting, by an RFID reader, a first transmit signal in a first transmit direction;
receiving, by the RFID reader, a first RFID tag response constituting a plurality of first response signals being received from a plurality of receive directions, wherein one of the plurality of first response signals that has a highest signal strength constitutes a maximum first response signal;
transmitting, by an RFID reader, a second transmit signal in a second transmit direction different from the first transmit direction;
receiving, by the RFID reader, a second RFID tag response constituting a plurality of second response signals being received from the plurality of receive directions, wherein one of the plurality of second response signals that has a highest signal strength constitutes a maximum second response signal;

responsive to a difference between a respective direction of the maximum first response signal and a respective direction of the maximum second response signal being within a predetermined threshold, determining an estimated direction of the RFID tag based on at least one of the respective direction of the maximum first response signal and the respective direction of the maximum second response signal; and responsive to the difference between the respective direction of the maximum first response signal and the respective direction of the maximum second response signal exceeding the predetermined threshold:
continuing to transmit, by the RFID reader, at successively lower power levels, another first transmit signal in the first transmit direction and another second transmit signal in the second transmit direction until, responsive to the first transmit signal and the second transmit signal being transmitted at some equal power level, the RFID reader receives only one of the first RFID tag response and the second RFID tag response; and
determining the estimated direction of the RFID tag based a respective direction of the only one of the first RFID tag response received by the RFID reader.

10. A radio frequency (RF) identification (RFID) reader system, comprising:
a housing;
an antenna assembly positioned at least partially within the housing and configured to transmit RF signals in at least two directions and to receive RF signals from a plurality of directions; and
a controller operatively connected to the antenna assembly, the controller configured to:
cause the antenna assembly to transmit a first transmit signal in a first transmit direction;
cause the antenna assembly to receive a first plurality of receive signals generated in response to the first transmit signal, each of the first plurality of receive signals having a respective first-receive-signal strength and being received from one of a plurality of receive directions;
cause the antenna assembly to transmit a second transmit signal in a second transmit direction that is different from the first transmit direction;
cause the antenna assembly to receive a second plurality of receive signals generated in response to the second transmit signal, each of the second plurality of receive signals having a respective second-receive-signal strength and being received from one of the plurality of receive directions;
determine a first receive direction, the first receive direction being associated with one of the first plurality of receive signals having a maximum first-receive-signal strength;
determine a second receive direction, the second receive direction being associated with one of the second plurality of receive signals having a maximum second-receive-signal strength;
compare the first receive direction and the second receive direction;
responsive to a difference between the first receive direction and the second receive direction being within a predetermined threshold, determine an estimated direction of the RFID tag based on at least one of the first receive direction and the second receive direction; and responsive to the difference between the first receive direction and the second receive direction exceeding the predetermined threshold:
(a) cause the antenna assembly to transmit another first transmit signal in the first transmit direction, the another first transmit signal being transmitted at a lower power level than an immediately precedingly transmitted first transmit signal;
(b) cause the antenna assembly to transmit another second transmit signal in the second transmit direction, the another second transmit signal being transmitted at a lower power level than an immediately precedingly transmitted second transmit signal;
(c) determine one of a presence and a lack of another first plurality of receive signals received at the antenna assembly in response to the another first transmit signal;
(d) determine one of a presence and a lack of another second plurality of receive signals received at the antenna assembly in response to the another second transmit signal;
(e) responsive to the presence of the another first plurality of receive signals and the lack of the another second plurality of receive signals, determine the estimated direction of the RFID tag based on the first receive direction;
(f) responsive to the lack of the another first plurality of receive signals and the presence of the another second plurality of receive signals, determine the estimated direction of the RFID tag based on the second receive direction; and
(g) responsive to the presence of the another first plurality of receive signals and the presence of the another second plurality of receive signals, repeat (a)-(g).

11. The RFID reader system of claim 10, wherein the controller is further configured to:
determine the estimated direction of the RFID tag based on the first receive direction by equating the estimated direction of the RFID tag with the first receive direction, and
determine the estimated direction of the RFID tag based on the second receive direction by equating the estimated direction of the RFID tag with the second receive direction.

12. The RFID reader system of claim 10, wherein the predetermined threshold is between 5 degrees and 15 degrees.

13. The RFID reader system of claim 10, wherein the controlled is positioned at least partially within the housing.

14. The RFID reader system of claim 10, wherein, responsive to the difference between the first receive direction and the second receive direction exceeding the predetermined threshold, the controller is further configured to:
(f.1) responsive to the lack of the another first plurality of receive signals and the lack of the another second plurality of receive signals:
cause the antenna assembly to transmit still another first transmit signal in the first transmit direction, the still another first transmit signal being transmitted at a power level that is higher than a power level of the immediately precedingly transmitted first transmit signal and lower than a power level of a most-recent first transmit signal that cause a receipt of a first RFID tag response by the antenna assembly;
cause the antenna assembly to transmit still another second transmit signal in the second transmit direction, the still another second transmit signal being transmitted at a power level that is higher than a power level of the immediately precedingly transmitted second transmit signal and lower than a power level of a most-recent second transmit signal that cause a receipt of a second RFID tag response by the antenna assembly; and
repeat (c)-(g).

15. The RFID reader system of claim 14, wherein the power level of the still another first transmit signal and the power level of the still another second transmit signal are approximately equal.

16. The RFID reader system of claim 10, wherein, responsive to the difference between the first receive direction and the second receive direction being within the predetermined threshold, the controller is further configured to determine the estimated direction of the RFID tag based on at least one of the first receive direction and the second receive direction by equating the estimated direction of the RFID tag with one of (i) the first receive direction, (ii) the second receive direction, and (iii) an average receive direction based on the first receive direction and the second receive direction.

17. The RFID reader system of claim 10,
wherein the another first transmit signal being transmitted at the lower power level than the immediately precedingly transmitted first transmit signal includes the another first transmit signal being transmitted at a 1 dB to 3 dB lower power level than the immediately precedingly transmitted first transmit signal, and
wherein the another second transmit signal being transmitted at the lower power level than the immediately precedingly transmitted second transmit signal includes the another second transmit signal being transmitted at a 1 dB to 3 dB lower power level than the immediately precedingly transmitted second transmit signal.

18. A radio frequency (RF) identification (RFID) reader system, comprising:
a housing;
an antenna assembly positioned at least partially within the housing and configured to transmit RF signals in at least two directions and to receive RF signals from a plurality of directions; and
a controller operatively connected to the antenna assembly, the controller configured to:
cause the antenna assembly to transmit a first transmit signal in a first transmit direction;
cause the antenna assembly to receive a first RFID tag response constituting a plurality of first response signals being received from a plurality of receive directions, wherein one of the plurality of first response signals that has a highest signal strength constitutes a maximum first response signal;
cause the antenna assembly to transmit a second transmit signal in a second transmit direction different from the first transmit direction;
cause the antenna assembly to receive a second RFID tag response constituting a plurality of second response signals being received from the plurality of receive directions, wherein one of the plurality of second response signals that has a highest signal strength constitutes a maximum second response signal;
responsive to a difference between a respective direction of the maximum first response signal and a respective direction of the maximum second response signal being within a predetermined threshold, determine an estimated direction of the RFID tag based on at least one of the respective direction of the maximum first response signal and the respective direction of the maximum second response signal; and responsive to the difference between the respective direction of the maximum first response signal and the respective direction of the maximum second response signal exceeding the predetermined threshold:

cause the antenna assembly to continue to transmit, at successively lower power levels, another first transmit signal in the first transmit direction and another second transmit signal in the second transmit direction until, responsive to the first transmit signal and the second transmit signal being transmitted at some equal power level, the antenna assembly receives only one of the first RFID tag response and the second RFID tag response; and determine the estimated direction of the RFID tag based a respective direction of the only one of the first RFID tag response received by the RFID reader.

19. The RFID reader system of claim 18, wherein the predetermined threshold is between 5 degrees and 15 degrees.

20. The RFID reader system of claim 18, wherein the successively lower power levels are equal power levels successively reduced by 1 dB to 3 dB.

21. A method of estimating a direction of a radio frequency (RF) identification (RFID) tag, comprising:

transmitting, by an RFID reader, a plurality of transmit signals, each of the plurality of transmit signals being transmitted in a respective direction;

for each of the plurality of transmit signals, receiving, at the RFID reader, an RFID tag response including a respective tag response direction associated with a strongest received signal strength indicator;

determining one of a presence and a lack of a variance between at least one of the respective tag response direction and at least one other of the respective tag response direction, the variance being present when the at least one of the respective tag response direction differs from the at least one other of the respective tag response direction by at least a predetermined threshold, the variance being lacking when each of the respective tag response direction does not differ from each other of the respective tag response direction by at least the predefined threshold;

responsive to the lack of the variance, estimating the direction of the RFID tag based on at least one of the respective tag response direction; and responsive to the presence of the variance, retransmitting the transmit signals that, upon a previous transmission, generated the respective RFID tag response, at a successively lower power level until there is the lack of the variance between the at least one of the respective tag response direction and the at least one other of the respective tag response direction from among a remaining subset of RFID tag responses, and estimating the direction of the RFID tag based on at least one of the respective tag response direction from among the remaining subset of RFID tag responses.

* * * * *